United States Patent [19]

Miller et al.

[11] Patent Number: 4,545,790

[45] Date of Patent: Oct. 8, 1985

[54] OXYGEN CONCENTRATOR

[75] Inventors: Gregory R. Miller; Steven G. Clark, both of St. Louis County, Mo.

[73] Assignee: Bio-Care, Incorporated, St. Louis County, Mo.

[21] Appl. No.: 521,999

[22] Filed: Aug. 11, 1983

[51] Int. Cl.⁴ ............................................. B01D 53/04
[52] U.S. Cl. ........................................ 55/161; 55/179; 55/389
[58] Field of Search ............... 55/25, 26, 58, 62, 68, 55/75, 160–163, 179, 180, 208, 387, 389

[56] References Cited

U.S. PATENT DOCUMENTS

| 3,176,444 | 4/1965 | Kiyonaga | 55/26 |
|---|---|---|---|
| 3,182,435 | 5/1965 | Axt | 55/33 X |
| 3,313,091 | 4/1967 | Berlin | 55/62 X |
| 3,338,030 | 8/1967 | Feldbauer, Jr. | 55/62 X |
| 3,498,025 | 3/1970 | Bednarski | 55/33 |
| 3,880,616 | 4/1975 | Myers et al. | 55/179 X |
| 4,162,146 | 7/1979 | Seibert | 55/179 X |
| 4,168,149 | 9/1979 | Armond et al. | 55/25 X |
| 4,205,967 | 6/1980 | Sandman et al. | 55/179 X |
| 4,222,750 | 9/1980 | Gauthier et al. | 55/68 X |
| 4,231,768 | 11/1980 | Seibert et al. | 55/179 |
| 4,272,265 | 6/1981 | Snyder | 55/179 X |
| 4,331,455 | 5/1982 | Sato | 55/62 X |
| 4,348,213 | 9/1982 | Armond | 55/25 |
| 4,349,357 | 9/1982 | Russell | 55/179 X |
| 4,440,548 | 4/1984 | Hill | 55/26 |
| 4,449,990 | 5/1984 | Tedford, Jr. | 55/33 X |

Primary Examiner—Robert Spitzer
Attorney, Agent, or Firm—Paul M. Denk

[57] ABSTRACT

An oxygen concentrator is disclosed which utilizes two molecular sieves to adsorb nitrogen out of compressed atmospheric air flowing therethrough so as to discharge oxygen enriched air for breathing purposes. Two such molecular sieves are used, one of which is operated in a regenerating mode while the other is operated in its adsorbing mode so a continuous supply of oxygen will be available to the patient. Periodically, the molecular sieves are automatically switched between their adsorbing and regenerating modes in such manner that the molecular sieve operating in its regenerating mode is incipiently recharged with high pressure, high oxygen quality gas prior to switching to its adsorbing mode. A method of operating the oxygen concentrator of this invention is also disclosed.

1 Claim, 4 Drawing Figures

OXYGEN CONCENTRATOR

BACKGROUND OF THE INVENTION

This invention relates to an oxygen concentrator, and more particularly to such an oxygen concentrator which may be efficiently switched between its adsorbing and regenerative modes.

Oftentimes, patients with chronic respiratory health problems are required to breath enriched oxygen air for extended periods of time, even when the patients are not hospitalized. As an alternative to the expense and the cumberance of supplying the patient with breathing oxygen from a compressed or liquid oxygen source, oxygen concentrators have come into widespread use for supplying supplemental oxygen to such patients which do not require pure oxygen, but who may breath oxygen-enriched air.

Generally, ambient air consists of about 21 percent oxygen, 78 percent nitrogen, and 1 percent of various trace gases including carbon dioxide and the like. Prior oxygen concentrator apparatus such as is shown in a variety of patents to C. W. Skarstrom, including U.S. Pat. Nos. 2,944,627 and 3,252,268, have been known in which a solid adsorbent has been utilized in an adsorption process to capture and retain a component of a gas mixture passing through the adsorbent bed. Generally, such adsorption apparatus is referred to as a molecular sieve, and a molecular sieve typically comprises a sealed container having a gas inlet and a gas outlet with the container enclosing a suitable adsorbent material bed, depending on the make-up of the gas passing through the molecular sieve. In particular, for use in oxygen concentrating applications, adsorbent beds of zeolite have been most widely used. The gas mixture percolates through the zeolite bed within the molecular sieve container, and a component of the gas mixture (referred to as the adsorbate). nitrogen, is captured and retained by the adsorbing solid or adsorbent. The amount of adsorbate (nitrogen) captured by the adsorbing solid is a semi-continuous, diffusion-limited, surface area-dependent process. After a certain amount of the adsorbate has been adsorbed on the surface of the adsorbing solid, the efficiency of the molecular sieve in adsorbing nitrogen from the superatmospheric air percolating through the molecular sieve decreases markedly.

As is typical in molecular sieve applications, it is necessary, after operating a molecular sieve in its adsorbing mode for a specified length of time, to regenerate the molecular sieve bed. Generally, regeneration of a zeolite bed in oxygen concentration equipment utilizes a purge gas stripping regeneration process in which the nonsorbed gas (oxygen) is utilized to reduce the partial pressure of the adsorbates (nitrogen) adsorbed on the surface of the adsorbate or zeolite bed. In this manner, the sorbed nitrogen on the surface of the adsorbent bed is stripped from the adsorbate and is vented to the atmosphere. After flowing the purging or stripping gas through the adsorbing bed for a sufficient length of time, the bed will have been effectively regenerated.

The process of using zeolite molecular sieves and of alternately operating the molecular sieves in a regenerative and an adsorbing mode is well-known in the art. It is also well-known to utilize a small amount of the oxygen-enriched gas being emitted from the molecular sieve in its adsorbing mode for use as the purging gas forced through the molecular sieve operating in it regenerative mode. However, the pneumatic and timing circuits for controlling the flow of gas through the molecular sieves have been complex and, therefore, expensive.

SUMMARY OF THE INVENTION

Among the several objects and features of the present invention may be noted the provision of an oxygen enrichment apparatus and method of operating the apparatus wherein a small portion of the oxygen-enriched gas emitted from one of the molecular sieves is utilized as a relatively low pressure purging gas for regenerating the other molecular sieve wherein, immediately prior to switching the molecular sieves between their regenerating and adsorbing modes or vice-versa, the molecular sieve completing its regenerating mode is precharged with superatmospheric pressure oxygen-enriched air immediately prior to the admittance of superatmospheric air (i.e., pressurized ambient air) so that upon initiation of its adsorption mode a substantially higher oxygen-enriched output results;

The provision of such apparatus has a control system for switching operating of the molecular sieves of an oxygen concentrator between their absorptive and regenerating modes which is of simple construction and which is reliable in operation;

The provision of such apparatus and method in which oxygen-enriched air is emitted at a relatively high concentration ratio (e.g., up to 95 percent oxygen) at flow rates suitable to provide enriched oxygen respiratory support for a patient;

The provision of such an oxygen concentration apparatus which eliminates the need for compression of liquid oxygen within heavy metal, high pressure tanks and their attendant dangers and expense;

The provision of such oxygen concentration apparatus which will continuously produce a highly oxygen enriched breathable air indefinitely; and The provision of such oxygen concentration apparatus which is easy to regulate, which is relatively small in size, which is of light weight, which is relatively easy to move from room-to-room, which is quiet in operation, which is reliable in operation, and which has a long service life.

Other objects and features of this invention will be in part apparent and in part pointed out hereinafter.

Briefly stated, apparatus of the present invention for producing oxygen-enriched air for breathing comprises an air compressor for pressurizing air to a superatmospheric pressure level. A first and a second adsorbent means is provided for adsorbing nitrogen (and other gases) from the superatmospheric air passing therethrough and for discharging oxygen-enriched air. Each of these adsorbent means includes a closed container having an inlet and an outlet, and further having a bed of adsorbent material therein. Still further, the apparatus of this invention comprises means for controlling the flow of the superatmospheric air and the oxygen-enriched air through the first and second adsorbent means so as to selectively operate each of the adsorbent means and either an adsorption mode for capturing and retaining nitrogen from the superatmospheric air flowing from the inlet to the outlet of the respective container of the adsorption means or in a regeneration mode for removal of the entrapped nitrogen from the adsorbent bed. The flow control means for each of the adsorbent means comprising a first and a second remotely operated valve, with each of these valves having an open position in which gas may flow therethrough and a closed position in which the flow of gas therethrough is blocked. The first valve for each of said adsorbent means has its inlet connected to the supply of superatmospheric air and has its outlet connected the inlet of its respective adsorbent means container such that air is directed to the inlet of the adsorbent means container when the first valve is open. The second valve for each of the adsorbent means has its inlet port connected to the inlet of its respective adsorbent means container and its outlet port vented to the atmosphere. The control means further includes a fifth valve having its inlet and outlet ports connected between the outlets of each of the adsorbent means containers. The fifth valve is selectively shiftable between an open position in which flow therethrough is permitted and a closed position in which flow therethrough is blocked. A throttling orifice is provided in each of the lines in communication with the outlets of each of said adsorbent means containers. The inlet and outlet ports of the fifth valve as connected to the adsorbent means containers' outlets intermediate the containers and the orifices. The flow control means further includes means for selectively actuating the first through the fifth valves so that with the first adsorbent means in its adsorbent mode and with the second adsorbent means in its regenerative mode, the first valve for the first adsorbent means is open, thereby to permit superatmospheric air to flow into the first adsorbent means container and to permit enriched oxygen to be discharged out of the first adsorbent means, the second valve for the first adsorption means being closed, the second valve for the second adsorbent means being opened, and the fifth valve being closed whereby air from the first adsorbent means from the outlet thereof is metered by at least one of said orifices as it flows to the outlet of the container for the second adsorbent means thereby to purge the adsorbent bed of the second adsorbent means and to be discharged to the atmosphere via the outlet of said second valve for said second adsorbent means. Upon the control system effecting a change in operating mode of the first adsorbent means from its adsorbing mode to its regenerative mode and effecting changing of the second adsorbtive means from its regenerative mode to it adsorbing mode, the control means first effecting momentary opening of the fifth valve thereby to permit oxygen-enriched superatmospheric air from the outlet of the first adsorbent means to enter the outlet of the second adsorbent means thereby to precharge the second adsorbent means with oxygen-enriched air. Then, the first valve for said first adsorbent means is closed, the second valve for the first adsorbent means is opened, the first valve for the second adsorbent means is opened, and the second valve for the second adsorbent means is closed whereby the first adsorbent means is then operated in its regenerating mode and the second adsorbent means is operating in its adsorbing mode.

The method of this invention of producing oxygen-enriched air for breathing utilizes apparatus generally as described above wherein the method comprises the steps of passing superatmospheric air through one of the molecular sieves or adsorbent means from the inlet to the outlet thereof for adsorbing nitrogen from the superatmospheric air and for emitting an oxygen-enriched air. The oxygen-enriched air emitted from the outlet of this one molecular sieve is metered to the outlet of the other molecular sieve whereby the oxygen-enriched air from the one molecular sieve flows through the other molecular sieve from the outlet to the inlet thereof, thereby to regenerate the adsorptive bed therein. Upon changing the one molecular sieve from its adsorptive to its regenerative mode, and upon changing the other molecular sieve from its regenerative to its adsorptive mode, momentarily, unthrottled communication is provided between the outlet of the one molecular and the other molecular sieve, thereby to precharge the other molecular sieve with oxygen-enriched air. Then, substantially simultaneously, the admittance of superatmospheric air to the inlet of the first molecular sieve is blocked and the inlet thereto is open to the atmosphere and superatmospheric air is admitted to the inlet of the other molecular sieve such that nitrogen is adsorbed from the superatmosphere flowing therethrough, and such that oxygen-enriched air is discharged from the outlet of the other molecular sieve.

BRIEF DESCRIPTION OF THE DRAWINGS

FIG. 3 is similar to FIG. 2, but with the positions of the various components shifted so as to operate the one molecular sieve in its regenerating mode and so as to operate the other molecular sieve in its adsorbing mode.

Corresponding reference characters indicate corresponding parts throughout the several views of the drawings.

DESCRIPTION OF PREFERRED EMBODIMENTS

Figure 2:
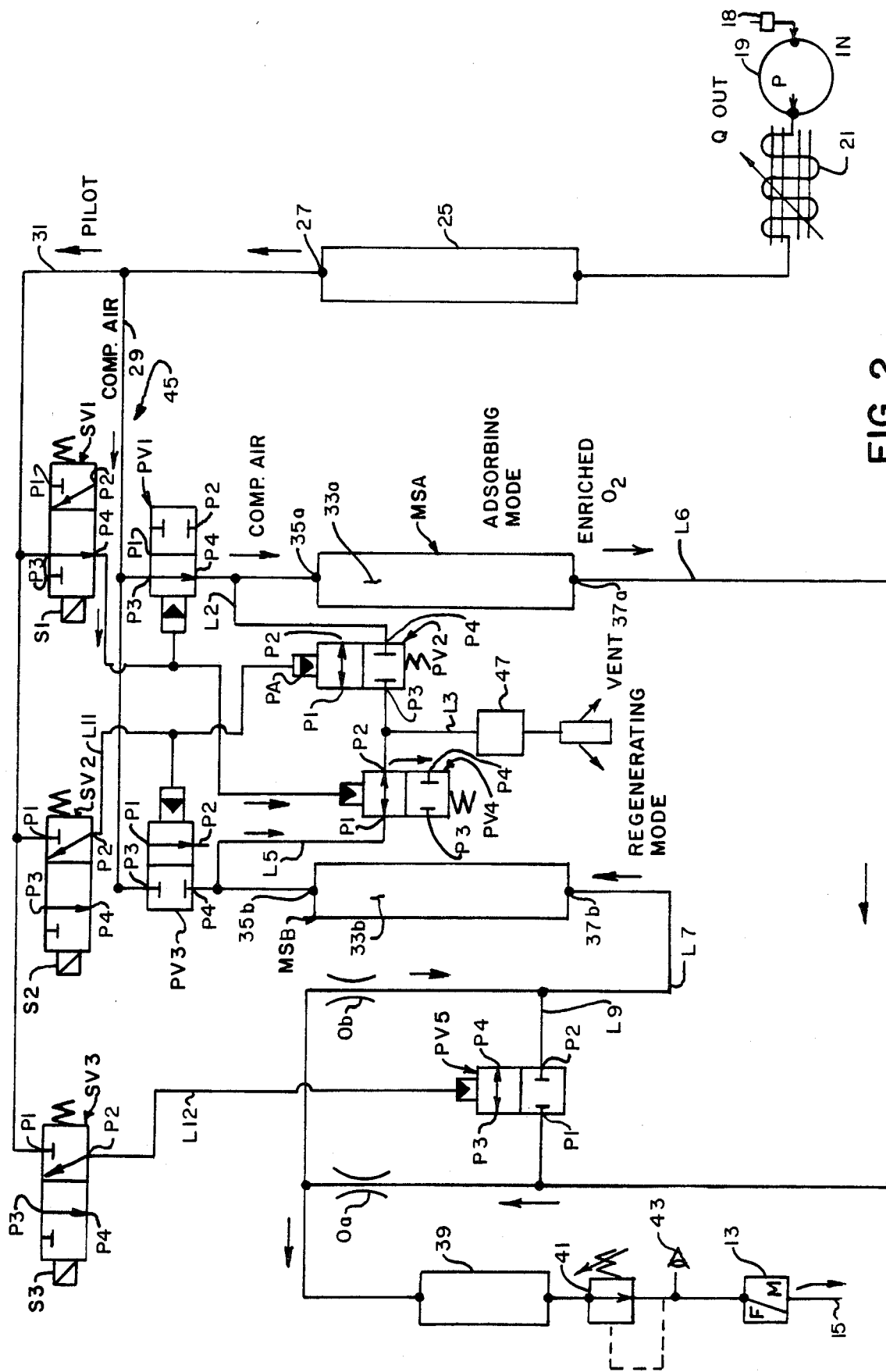
FIGS. 2 and 3 are pneumatic schematics of the apparatus contained within the housing shown in FIG. 1, with FIG. 2 illustrating the position of the various components when one of the molecular sieves is operated in its adsorbing modes and when the other molecular sieve is operating in its regenerating mode.
Figure 3:
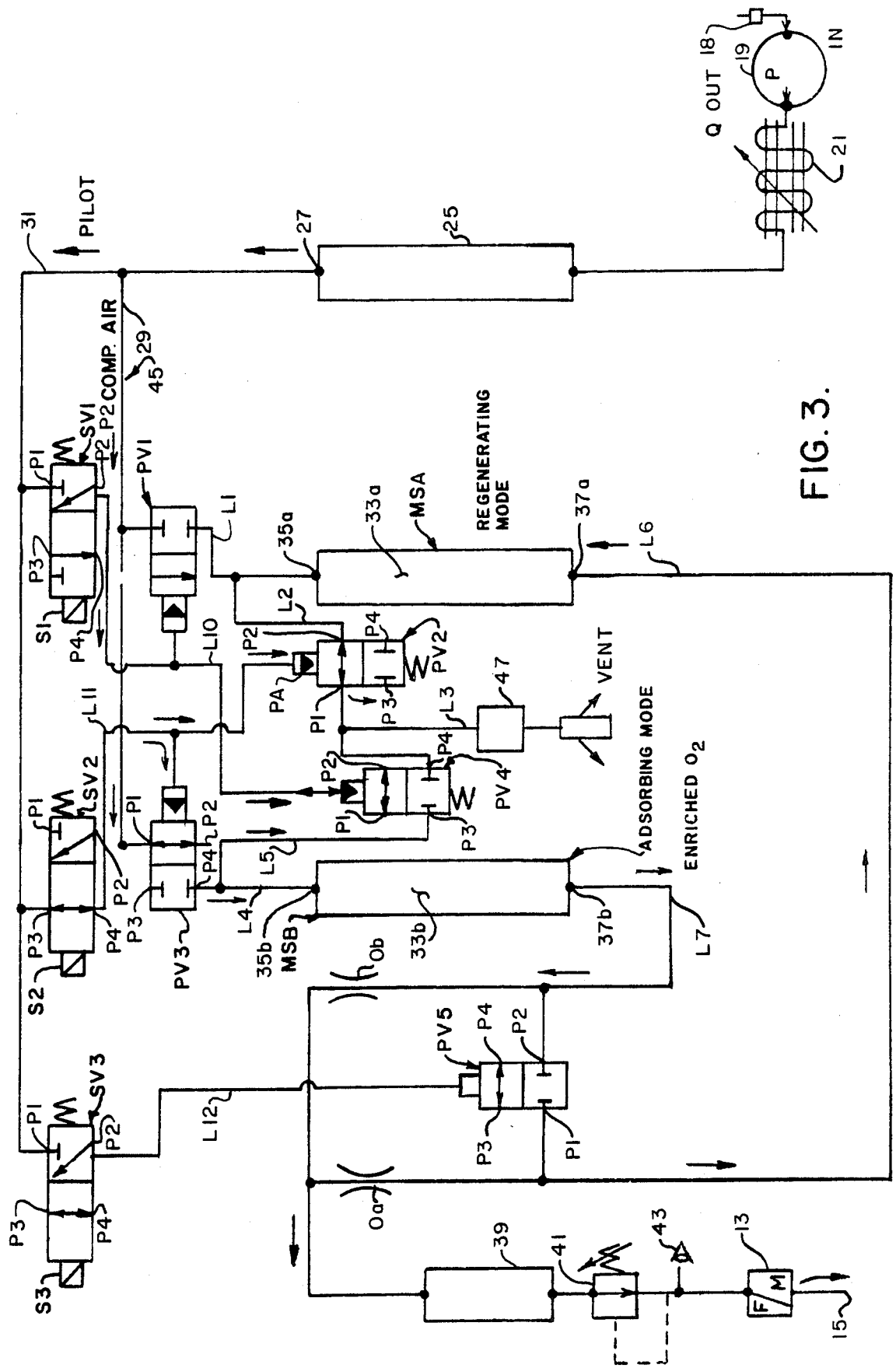

Referring now to the drawings, oxygen enrichment apparatus of the present invention is indicated in its entirety by reference character 1. The apparatus is shown to comprise a cabinet 3 enclosing the components of this apparatus, as shown in FIGS. 2 and 3, with the cabinet being rollably mounted on casters 5. A handle 7 is provided at the top of the cabinet to aid in moving the cabinet on casters 5, and the aid in lifting the cabinet up and doen stairs and the like. On the side of the cabinet, as indicated at 8, an air inlet opening is provided with the inlet opening having a dust filter 9 of open cell synthetic material or the like fitted therein. A power cord 10 extends from the cabinet and is adapted to be plugged into a conventional wall outlet for powering the unit in a manner as will become apparent. It will be appreciated that in order to operate the oxygen concentrator of the present invention, no services other than standard 120 volt electrical power need be provided.

On the front face of cabinet 3, an on-off rocker-type switch 11 is provided for energization and de-energization of the unit, and an adjustable flowmeter 13 is provided so that the user can readily regulate the flow of enriched oxygen air out of the unit to a patient for oxygen respiratory support. As indicated at 15, an oxygen-enriched air outlet is provided and, as indicated at 17, an optional humidifier may be utilized so as to increase the amount of water vapor carried by the enriched oxygen air delivered to the patient. Generally, the width of cabinet 3 is about 12 inches (30.5 cm), and the height of the cabinet (without casters 5) is about 22 inches (55.9 cm). The weight of concentrator 1 of the present invention with casters 5 attached is about 47 pounds (21.3 kg), thus making the concentrator of the present invention portable so that a patient undergoing respiratory therapy may readily move the concentrator of the present invention from room-to-room.

Generally, ambient air is a mixture of gases consisting essentially of nitrogen and oxygen, with the ratio of nittrogen to oxygen being about 78 percent nitrogen, 21 percent oxygen, with a variety of trace gases, such as carbon dioxide, carbon monoxide, rare element gases and various hydrocarbons. In accordance with this invention, concentrator 1 physically separates oxygen from the other gases contained in normal ambient air such that the gas emitted from the concentrator has oxygen concentration levels up to about 95 percent, with the majority of the atmospheric nitrogen, carbon dioxide, hydrocarbons, and other relatively large molecular weight gases being retained within the concentrator. Generally, the concentrator works on the adsorption principle in which an adsorptive bed adsorbs nitrogen from the air so as to enrich and to concentrate oxygen in the gas discharged from the apparatus.

As shown in FIGS. 2 and 3, an electrically driven compressor 19 draws air through the intake filter 9 so as to remove dirt and dust particles from the intake air stream. The air is then drawn through a standard 5 milicron hospital grade bacteria filter 18 and is drawn into the intake side of compressor 19. Compressor 19 increases the pressure level of ambient air to a superatmospheric pressure level (e.g., up to about 30 psig), and discharges the superatmospheric air through a cooling coil 21 which reduces the temperature of the air. Then, the superatmospheric air flows into a superatmospheric reservoir tank 25. The reservoir tank 25 has an outlet 27 which is in communication with a main compressed superatmospheric air supply line 29 and with a pilot pressure line 31 for purposes as will appear.

Further in accordance with this invention, concentrator 1 utilizes two adsorbent molecular sieve means, as indicated in their entirety at MSA and MSB, respectively. Each of these molecular sieve means includes a respective molecular sieve tank or canister, as indicated at 33a, 33b. Each of the molecular sieve canisters has a respective inlet 35a, 35b and a respective outlet 37a, 37b. Each of the molecular sieve means includes a bed (not shown) of adsorptive material therein, such as Zeolite 5A or the like, which captures and retains selected components of the ambient air (e.g., adsorbates such as nitrogen, carbon dioxide, water, and the like) on the surface of the adsorbent bed as the superatmospheric air percolates through the molecular sieve bed. To those skilled in the art, the selection of various zeolite adsorbent materials for selectively capturing nitrogen is well known, and thus an exact description of the adsorbent will not herein be disclosed. As is typical, after the molecular sieve adsorbent means MSA or MSB have been operating in their adsorbent mode for a predetermined length of time, the adsorbent bed therein will become saturated with the adsorbates (e.g., nitrogen) such that the quality of the oxygen-enriched air emitted therefrom will markedly decrease. As is well known, the molecular sieve beds must periodically be operated in regenerative mode thereby to strip the adsorbates from the surface of the adsorbent beds therein so as to exhaust the adsorbates to the atmosphere, and to restore the molecular sieve adsorbent beds to their original states in which they are capable of adsorbing substantial quantities of nitrogen (and other gases) from atmospheric air.

The outlets 37a, 37b of the molecular sieves MSA and MSB are connected by lines L6 and L7, respectively, to an oxygen-enriched reservoir tank 39. The outlet of reservoir tank 39 is connected to a discharge pressure regulator 41 and a check valve 43. Flowmeter 13 is interposed between the pressure regulator 41 and the enriched oxygen outlet 15 so as to regulate the flow of oxygen-enriched air to the patient. In FIGS. 2 and 3, the humidification means 17 is not shown.

As shown in FIG. 2, a pair of metering orifices Oa and Ob are provided in lines L6 and L7, respectively, between the outlets 37a and 37b of molecular sieves MSA and MSB, and oxygen-enriched reservoir tank 39. Valve PV5 in line L9 is connected between lines L6 and L7 between molecular sieve outlets 37a, 37b, and reservoir 39 for purposes as will appear. It will be appreciated that metering orifices Oa, Ob permit oxygen-enriched air to flow under pressure from the molecular sieve in its adsorbing mode at a metered flow rate to enriched oxygen air supply reservoir 39. The metering orifices also permit the backflow of enriched oxygen air from reservoir 39 to the outlet 37a, 37b of the molecular sieve in the regenerating mode so that enriched oxygen air (constituting a purging gas) is, for example, permitted to flow into the outlet 37b of the molecular sieve MSB operating in its regenerating mode (as shown in FIG. 2).

In accordance with this invention, means, as generally indicated at 45, is provided for controlling the flow of air to molecular sieves MSA and MSB when one of the molecular sieves (e.g., molecular sieve MSA as shown in FIG. 2) is operating in its adsorbing mode, and when the other molecular sieve (e.g., sieve MSB) is operating in its regenerating mode. More particularly, this controlling means is shown to comprise five pilot operated valves, as indicated at PV1–PV5, which in turn are selectively operated by three electrically operated solenoid control valves, as indicated generally at SV1–SV3, which may be two-position, three-way valves. Generally, each of the pilot operated valves PV1–PV5 and each of the solenoid valves SV1–SV3 is a pilot operated two-position valve having four ports, as indicated at P1–P4. Each of the pilot valves is selectively movable via a pilot actuator PA between a closed position in which the flow of fluid or gas between ports P1 and P2 is blocked, and an open position in which gas may readily flow through the valve between port P3 and P4. Generally, valves PV1–PV5 and SV1–SV3 are normally closed valves so that flow through the valves is blocked, unless a pilot pressure is applied to their pilot actuators PA of the valve via solenoid valves SV1–SV3. While valves PV1–PV5 are herein described as pressure actuated pilot valves, those skilled in the art will recognize that other types of remotely operable valves may be used. Of course, those skilled in the art will recognize that pilot valve PV5 could be a normally open valve such that solenoid valve SV3 could also be normally open. Also, if pilot valve PV5 were normally open, solenoid valve SV3 could be replaced with a shuttle valve (not shown) with this shuttle valve receiving its control from the pilot pressure supplied by either solenoid valve SV1 or SV2 such that whenever either of the valves SV1 or SV2 is energized, the shuttle valve is actuated and pilot valve PV5 is closed.

Also, it will be appreciated that pilot valves PV1-PV4 could be replaced by a four-way, three-position valve (not shown) with its position blocked.

More particularly, as shown in FIG. 2, with molecular sieve MSA in its adsorbing mode and with molecular sieve MSB in its regenerating mode, pilot valve PV1 is in its open position such that its ports P3 and P4 are in communication with main superatmospheric air infeed line 29 such that the superatmospheric air is permitted to flow through valve PV1 to inlet 35a of molecular sieve MSA wherein nitrogen within the superatmospheric air is adsorbed by the adsorbent bed within molecular sieve MSA such that enriched oxygen air is emitted from outlet 37a of the first molecular sieve MSA into line L6. It will be further noted that pilot valve PV2 is in its closed position such that super atmospheric air from line L1 via line L2 is blocked from flowing through pilot valve PV2.

Still further referring to FIG. 2, it will be noted that the other molecular sieve MSB is in its regenerating mode in which a purging or stripping gas (e.g., enriched oxygen air from molecular sieve MSA) enters inlet 37b of molecular sieve MSB and strips the adsorbates from the surface of the adsorbent bed within molecular sieve MSB. These adsorbate components are then exhausted from canister 33b via outlet opening 35b, and are directed through lines L4 and L5 to pilot valve PV4 which is in its open position such that its ports P1 and P2 are in communication with line L5 and with a line L3 leading to a muffler and vent assembly 47 thereby to discharge the adsorbate gases to the atmosphere. It will also be noted that with molecular sieve MSB in its regenerating mode, pilot valve PV3 is in its closed position with the flow of superatmospheric air from supply line blocked.

Figure 1:
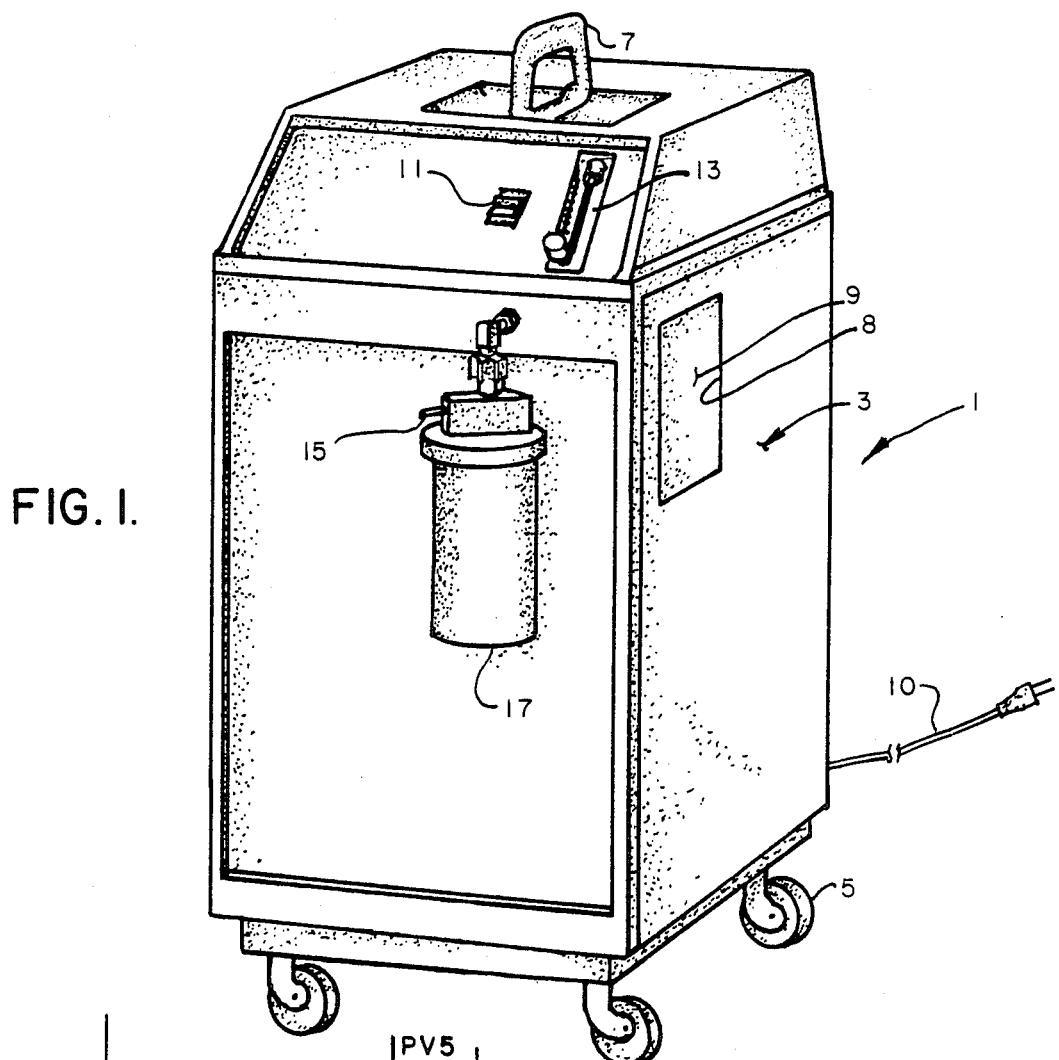
FIG. 1 is a perspective view of a console housing the oxygen concentrator of the present invention.
Figure 4:
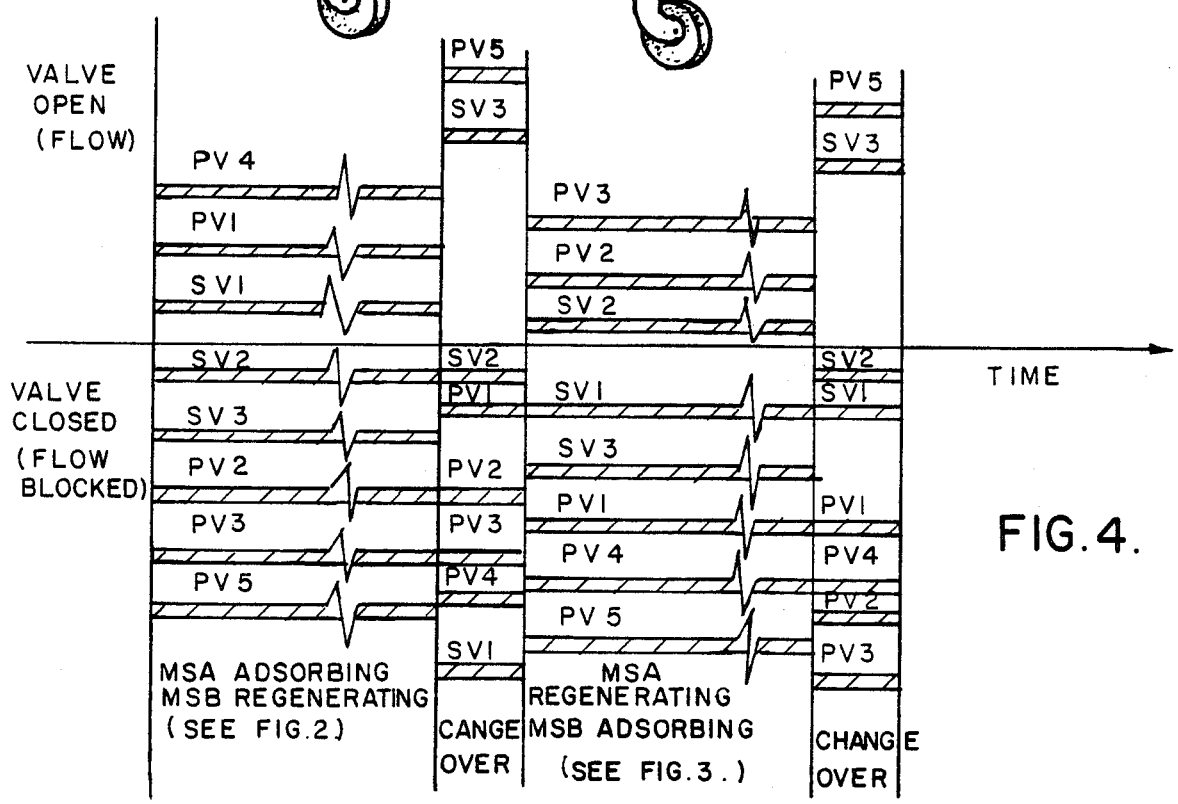
FIG. 4 is a block diagram of the operating positions of the various valves shown in FIGS. 2 and 3 and during the changeover between the various modes, in accordance with this invention.

Further in accordance with this invention, in order to maintain valves PV1-PV4 in their above-stated positions (i.e., with valve PV1 in its open position, with valve PV2 in its closed position, with valve PV3 in its closed position, with valve PV4 in its open position, and with valve PV5 in its closed position), solenoid valve SV1 has an electrical signal supplied to its respective solenoid actuator S1 via a timing circuit (not shown) so that the valve body of solenoid SV1 is shifted from its normally closed position to its open position in which its ports P3 and P4 are connected to pilot supply line 31 such that pilot actuating air is directed to the pilot actuators PA of pilot valves PV1 and PV4 via line L10. Solenoid valves SV2 and SV3 are not energized so that pilot pressure is not supplied to pilot actuators of PA of valves PV2, PV3 and PV5, and thus these pilot valves are in their normally closed positions as shown in FIG. 2, and as indicated in FIG. 4.

Further in accordance with this invention, after molecular sieve MSA has operated in its adsorbing mode and after molecular sieve MSB has operated in its regenerating mode for a predetermined length of time such that the adsorbent bed in molecular sieve MSA has become substantially saturated with adsorbate gas (nitrogen) and such that the adsorbent bed in molecular sieve MSB is substantially purged of adsorbate gas, energization of solenoid valve SV1 is terminated and an electrical signal is momentarily provided to solenoid actuator S3 of solenoid SV3. The de-energization of valve SV1 removes pilot pressure from the pilot actuators PA of valves PV1 and PV4 allowing them to return to their normally closed positions. Energization of valve SV3 causes it to move from its normally closed position (as shown in FIG. 2) to its open position (see FIG. 4) in which its port P3 is connected to pilot supply line 31 and in which its outlet port P4 is connected to line L12 so as to momentarily supply a pilot pressure signal via line L12 to pilot actuator PA of pilot valve P5 thereby to shift the valve body of valve P5 from its normally closed position (as shown in FIG. 2) to its open position in which its ports P3 and P4 are connected to line L9 thus providing direct, unrestricted communication between lines L6 and L7 such that a surge of enriched oxygen air exiting outlet 37a of molecular MSA (which still has a considerable volume of oxygen-enriched air therein at superatmospheric pressure) is permitted to flow through valve PV5 to inlet 37b of molecular sieve MSB. This surge of enriched oxygen air incipiently purges canister 33b of the purging gases which are vented to the atmosphere via valve PV4 and via vent 47 and precharges cannister 33b with oxygen-enriched air.

Then, simultaneously with de-energization of solenoid valve SV3 so as to again permit valve PV5 to close, solenoid valve SV2 is energized so as to move its ports P3 and P4 into communication with pilot supply line 31 and with line L11 thereby to shift the valve members in valves PV2 and PV3 from their closed to their open positions. In this manner, superatmospheric air from supply tank 25 flows through line 29 and through valve PV3 so as to enter canister 33b which has already been precharged with enriched oxygen air. Thus, enriched oxygen air from the precharged canister 33b will immediately, upon opening of valve P3, begin to flow through orific Ob to the enriched oxygen reservoir tank 39, thus ensuring that a substantially uninterrupted flow of enriched oxygen air flows to the enriched oxygen reservoir tank 39 upon changeover of the molecular sieve means from their adsorbing to their regenerating modes, or vice-versa.

Also, upon the closing of valves PV1 and PV4, superatmospheric air is prevented from entering the first molecular sieve MSA, and inlet 35b to the second molecular sieve MSB is closed thereby to ensure that the superatmospheric air is directed to the inlet 35b of the second molecular sieve MSB via valve PV3 and the superatmospheric air percolates through the adsorbent bed provided within canister 33b.

Further, with the oxygen concentrator 1 of the present invention operating in the mode shown in FIG. 3 with molecular sieve MSB in its adsorbing mode and with molecular sieve MSA in its regenerating mode, upon changeover, solenoid valve SV3 is again momentarily energized so as to open communication between lines L6 and L7 by opening valve PV5, thereby to purge and to precharge molecular sieve MSA with enriched oxygen air immediately prior to switching from its regenerating to its adsorbing mode. Because this changeover switching operation was heretofore described in detail in regard to FIG. 2, a detailed description of the switching modes from FIG. 3 to FIG. 2 will not be herein described in detail for the purposes of brevity.

In view of the above, it will be seen that the several objects and features of this invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. An apparatus for producing oxygen-enriched air for breathing comprising an air compressor for pressuring air to a super atmospheric pressure, at least a first and a second adsorbent means for adsorbing nitrogen from the super atmospheric air passing therethrough and for discharging oxygen-enriched air, each said adsorbent means including a closed container having inlet and outlet ports and having a bed of adsorbent material therein, and means for controlling the flow of super atmospheric air and oxygen-enriched air through said first and second adsorbent means so as to selectively operate the adsorbent means either in an adsorbtion mode for capturing and retaining nitrogen from the super atmospheric air flowing from the inlet to the outlet ports thereof, or in a regenerating mode for removal of the nitrogen from the adsorbent bed therein, said flow control means for each of the adsorbent means comprising first and second remotely operated two-positional valves, said first valve of each flow control means for each of said adsorbent means having an open position in which air may flow therethrough and a closed position in which the flow of air therethrough is blocked, said first valve of each flow control means of said adsorbent means having an inlet connected to said compressor and an outlet connected to its respective adsorbent means container such that super atmospheric air is directed to the inlet of a respective adsorbent means when its first respective valve therefor is open, said second valve of each flow control means for each of said adsorbent means having an inlet port connected to the inlet of its respective said adsorbent means container and an outlet port vented to the atmosphere, said control means further including a third three-connection, two-position valve having its inlet and outlet ports connected between the outlets of each of said adsorbent means, said third valve being selectively shiftable between an open position in which flow therethrough is permitted and a closed position in which the flow therethrough is blocked, a throttling orifice in each of the lines in communication with the outlet of each of said respective adsorbent means containers, and an outlet container for receiving enriched oxygen air from said throttling orifices, each throttling orifice permitting oxygen enriched air to flow under pressure from the adsorbent means in its adsorption mode to the outlet container and also to continuously exert pressure of the enriched oxygen air from the outlet container and against the outlet of its respective adsorbent means container, and to allow said air to flow to the other adsorbent means container during its regenerative mode, the inlet and outlet ports of said third valve being connected to said adsorbent means containers' outlets intermediate said containers and said orifices, said flow control means further including means for selectively actuating said pair of first valves, the pair of second valves, and the third valve, so that with said first adsorbent means in its adsorbent mode, and with said second adsorbent means in its regenerative mode, said first valve for said first adsorbent means is open thereby to permit super atmospheric air to flow into said first adsorbent means and to permit enriched oxygen air to be discharged out of said first adsorbent means, said second valve for said first adsorbent means being closed, said first valve for said second adsorbent means being closed, said second valve for said second adsorbent means being open, and said third valve being closed whereby enriched oxygen air from said first adsorbent means flows from the outlet thereof and is metered by at least one of said throttling orifices as it flows to the said second adsorbent means thereby to purge said second adsorbent means and to be discharged to the atmosphere via the outlet of said second valve for said second adsorbent means, and upon said control system effecting a change of operating mode of said first absorbent means from its adsorbing mode to its regenerating mode and effecting changing of said second adsorbent means from its regenerative mode to its adsorbing mode, said control means first effecting momentary opening of said third valve thereby to permit oxygen-enriched super atmospheric air from the outlet of said first adsorbent means to enter the outlet of said second adsorbent means thereby to precharge said second adsorbent means with oxygen-enriched air, and then effecting closing of said first valve for said first adsorbent means, opening said second valve for said first adsorbent means, opening said first valve of said second adsorbent means, closing said second valve for said second adsorbent means, and closing said third valve.

* * * * *